(12) United States Patent
Kastor

(10) Patent No.: US 9,788,685 B2
(45) Date of Patent: Oct. 17, 2017

(54) BEVERAGE MACHINE WITH CARAFE COMPATIBLE DRIP TRAY

(71) Applicant: Keurig Green Mountain, Inc., Waterbury, VT (US)

(72) Inventor: Nikolas Kastor, Arlington, MA (US)

(73) Assignee: Keurig Green Mountain, Inc., Waterbury, VT (US)

( * ) Notice: Subject to any disclaimer, the term of this patent is extended or adjusted under 35 U.S.C. 154(b) by 567 days.

(21) Appl. No.: 14/326,550

(22) Filed: Jul. 9, 2014

(65) Prior Publication Data

US 2015/0013546 A1 Jan. 15, 2015

Related U.S. Application Data

(60) Provisional application No. 61/844,691, filed on Jul. 10, 2013.

(51) Int. Cl.
*A47J 31/46* (2006.01)
*A47J 31/44* (2006.01)
*A47J 31/06* (2006.01)

(52) U.S. Cl.
CPC ......... *A47J 31/4428* (2013.01); *A47J 31/061* (2013.01)

(58) Field of Classification Search
CPC .............................. A47J 31/4428; A47J 31/061
USPC .................... 99/300, 283; 137/312, 314, 313
See application file for complete search history.

(56) References Cited

U.S. PATENT DOCUMENTS

| | | |
|---|---|---|
| 5,503,060 A | 4/1996 | Morecroft et al. |
| 5,889,684 A | 3/1999 | Ben-David et al. |
| 8,002,146 B2 | 8/2011 | Cahen |
| 8,002,147 B2 | 8/2011 | Wells et al. |
| 8,152,024 B2 | 4/2012 | Njaastad et al. |
| 8,408,255 B1 | 4/2013 | Wade et al. |
| 2011/0185907 A1 | 8/2011 | De'Longhi |
| 2011/0265658 A1 | 11/2011 | Talon et al. |
| 2012/0031278 A1* | 2/2012 | Sweet ................ A47J 31/4428 99/290 |
| 2012/0186457 A1 | 7/2012 | Ozanne et al. |

(Continued)

FOREIGN PATENT DOCUMENTS

| | | |
|---|---|---|
| EP | 2499946 A1 | 9/2012 |
| WO | WO 2013087607 A2 | 6/2013 |

OTHER PUBLICATIONS

International Search Report for PCT Application No. PCT/US2014/045953 dated Sep. 23, 2014.

*Primary Examiner* — Omar Flores Sanchez
(74) *Attorney, Agent, or Firm* — Wolf, Greenfield & Sacks, P.C.

(57) ABSTRACT

A beverage forming method and system in which a carafe is positionable at a carafe receiving area of a beverage forming machine with a lid of the carafe in an open position or a closed position. The carafe may be positioned at the carafe receiving area in any one of multiple rotational positions within a range of 45 to 180 degrees, and the machine may detect whether the lid is open or not for any of the rotational positions. A drip tray may receive waste liquid into two different waste liquid receiving areas, and may detect the presence of liquid for different volumes received into the respective areas. Holes or other opening in the drip tray may be configured to receive liquid flowing down a side surface of a carafe when the liquid reaches a periphery of the carafe base.

36 Claims, 10 Drawing Sheets

(56) References Cited

U.S. PATENT DOCUMENTS

2013/0004629 A1\* 1/2013 Clark ................ A47J 31/4467
426/231
2016/0255992 A1\* 9/2016 Miller ................ A47J 31/4482

\* cited by examiner

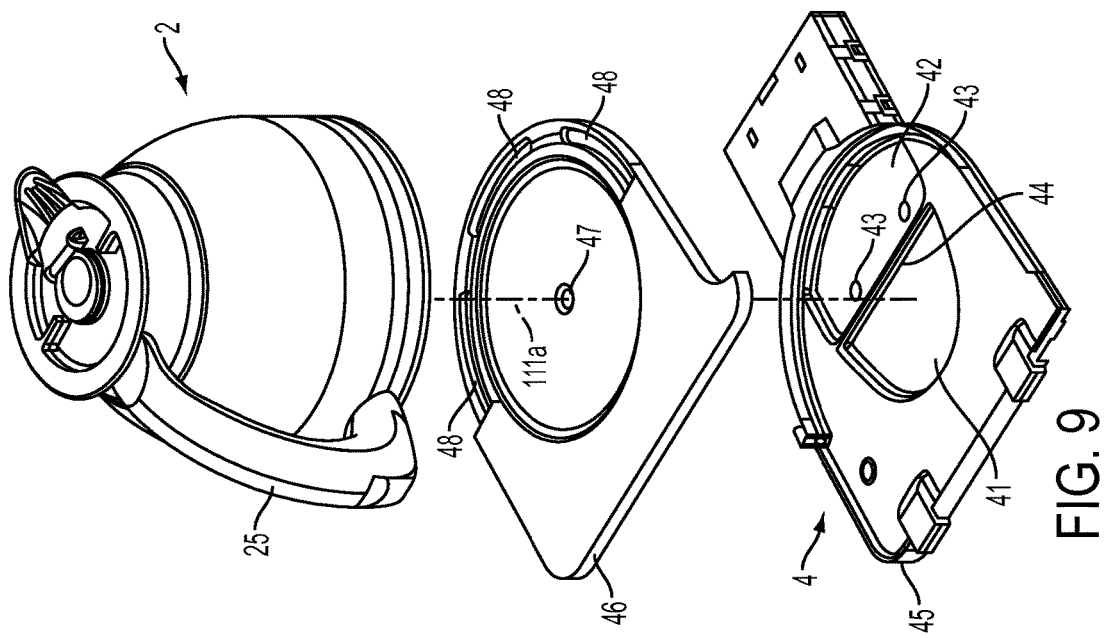
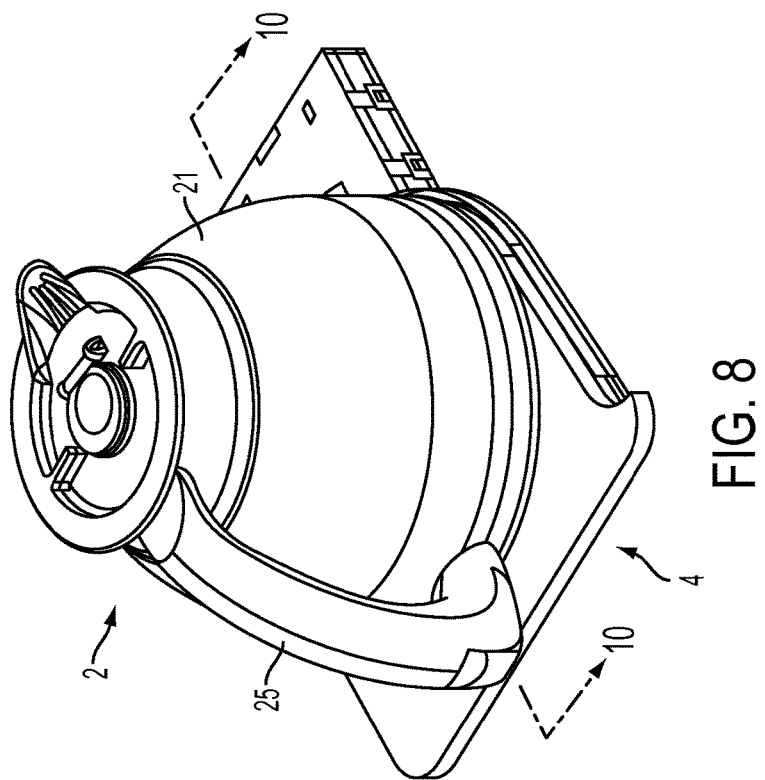

BEVERAGE MACHINE WITH CARAFE COMPATIBLE DRIP TRAY

CROSS REFERENCE TO RELATED APPLICATION

This application claims the benefit of U.S. Provisional Application No. 61/844,691, filed Jul. 10, 2013, which is hereby incorporated by reference in its entirety.

BACKGROUND

1. Field of Invention

This invention relates to beverage forming systems, such as coffee brewers that use a liquid to form a coffee beverage.

2. Related Art

Beverage forming systems that use a liquid, such as water, to form a beverage are well known. For example, U.S. Patent Application Publication 2011/0185907 discloses a coffee machine and receptacle that can be docked at a filling position on the machine to receive coffee made by the machine. The machine can detect the presence of the receptacle at the filling position, and starts an operating mode to produce coffee when the receptacle is at the filling position. However, the receptacle cannot be placed at the filling position unless a lid of the receptacle is oriented so that a recess in the lid is registered with a beverage spigot of the machine. U.S. Pat. No. 5,503,060 discloses a coffee maker that includes a carafe with a pivotal top lid. The brewer is arranged so that the carafe cannot be placed at a position to receive coffee from the machine unless the lid is in the open position.

SUMMARY OF INVENTION

In some embodiments, a carafe of a beverage forming apparatus may be positioned at a carafe receiving area of a beverage forming machine to receive beverage whether a lid of the carafe is open or not. Thus, the carafe may be placed at the carafe receiving area whether or not the carafe is intended to receive beverage from the beverage forming machine. This is in contrast to some systems in which a carafe cannot be placed at a carafe receiving area unless a lid of the carafe is in an open position to receive beverage. As a result, aspects of the invention provide for a more convenient and easier to operate system, e.g., because a user need not be concerned with lid position or its open/closed state to place a carafe at a receiving area of a beverage machine. Moreover, undesired dispensing of beverage when the carafe lid is closed can be prevented by detecting a position of the lid while the carafe is at the receiving area. Thus, even if a user tries to create a beverage with the carafe at the receiving area and the lid is closed, the beverage forming machine can detect the lid closed state and prevent beverage dispensing. In some embodiments, the lid open/closed state can be detected for multiple rotational positions of the carafe at the receiving area. Thus, a user may conveniently place the carafe in a relatively wide range of rotational positions, e.g., in a position in a range of 45-180 degrees, yet still allow the beverage machine to detect the lid open/closed state.

While the beverage machine may be controlled to dispense beverage only when a carafe lid is detected to be in the open position, there may be situations in which dispensed beverage is not actually received by the carafe. For example, if a user places a partially full or full carafe at the carafe receiving area prior to beverage dispensing, the dispensed beverage will likely overflow the carafe because the carafe does not have sufficient volume to receive the beverage. In such a situation, it may be desirable to quickly detect the overflow liquid and stop beverage dispensing to prevent spilling onto a countertop or other work surface. This concern may be even greater where the beverage machine is configured to make relatively large volumes of beverage, such as 64 ounces or more. On the other hand, the beverage machine may be expected to drip a relatively small amount of liquid from the beverage outlet after beverage dispensing is complete and the carafe is removed from the receiving area. (Such dripping may be caused by thermal expansion, condensation, or other causes, as is known to those of skill in the art.) In such a case, it may be desirable to catch the waste liquid in a drip tray, but not prevent machine operation because of a small amount of expected dripping.

Aspects of the invention provide for a drip tray assembly that can rapidly respond one type of waste liquid discharge, such as detecting overfilling of a carafe upon receipt of a relatively small amount of overflow liquid, while having a more delayed response to another type of waste liquid discharge, such as dripping from the beverage outlet. The drip tray assembly may provide this function using a single waste liquid sensor, and may be removable from the housing, e.g., for discarding collected waste liquid. While a drip tray assembly having features described herein may be used advantageously with a carafe lid detection system, the two features need not be used together, and thus a beverage machine may include a drip tray assembly having inventive features and yet not employ a carafe lid detection system. That is, inventive aspects may be used alone and/or in any suitable combination with each other.

In one aspect of the invention, a beverage forming apparatus includes a housing with a beverage outlet and a carafe receiving area at which a carafe may be associated with the housing to receive beverage dispensed from the beverage outlet. A drip tray assembly may be arranged to receive waste liquid at the carafe receiving area, and include a waste liquid sensor and first and second waste liquid receiving areas each having a corresponding opening through which waste liquid enters the receiving area. The first waste liquid receiving area may be arranged to receive waste liquid falling from the beverage outlet, and the waste liquid sensor may be arranged to detect the presence of waste liquid in response to a first volume of liquid received at the first waste liquid receiving area. In contrast, the waste liquid sensor may be arranged to detect the presence of waste liquid in response to a second volume of liquid received at the second waste liquid receiving area where the first and second volumes are different from each other. For example, the second waste liquid receiving area may be arranged to receive liquid that overflows the carafe, and if the second volume is relatively small and less than the first volume, the system may be capable of rapidly detecting an overflow condition.

The beverage forming apparatus may also include a beverage forming station supported by the housing and arranged to combine a precursor liquid with a beverage material to form a beverage that is dispensed from the beverage outlet. For example, the beverage forming station may use cartridges to form beverages by mixing water or other liquid with a beverage medium in the cartridges. A precursor liquid supply system may be supported by the housing and provide precursor liquid to the beverage forming station, and a control circuit may be arranged to control the liquid supply system to deliver precursor liquid to the beverage forming station to dispense a beverage.

In one embodiment, the first and second waste liquid receiving areas may be separated from each other by a wall, and the waste liquid sensor may be located in the second waste liquid receiving area. As a result, liquid received into the first waste liquid receiving area may collect until a threshold volume is achieved. Thereafter, liquid may flow over the wall and into the second waste liquid receiving area for detection by the waste liquid sensor. This arrangement may allow the drip tray assembly to use a single waste liquid sensor, and yet detect the presence of waste liquid for two different volumes of liquid received by the waste liquid receiving areas. The waste liquid sensor may include at least one conductive probe or other suitable sensor arranged to detect a presence of liquid in the drip tray assembly.

In one embodiment, the drip tray assembly includes a base that defines the first and second waste liquid receiving areas, and a plate arranged over the base that includes the openings through which liquid enters for receipt by the first and second waste liquid receiving areas. A wall may extend upwardly from an upper surface of the base and separate the first and second waste liquid receiving areas from each other. The waste liquid sensor may be arranged in the second waste liquid receiving area of the base, and liquid in the first waste receiving area may flow over the wall and into the second waste receiving area to be detected by the waste liquid sensor.

Although in some of the embodiments described above, the first and second waste liquid receiving areas are separated by a wall, the two areas may be separated from each other, and yet be in fluid communication, in other ways. Thus, the first and second waste liquid receiving areas may be separated from each other such that liquid flows from the first to the second waste liquid receiving area when a volume of liquid in the first receiving area exceeds a threshold, e.g., by way of a wall separator as described above, or by way of a siphon, a valve, or other suitable arrangement. Of course, the first and second waste liquid receiving areas need not be in fluid communication. For example, each receiving area may have its own waste liquid sensor arranged to detect the presence of liquid for different volumes received by the respective area. Alternately, a single waste liquid sensor may be arranged at a wall that separates the waste liquid receiving areas, and yet configured to detect the presence of liquid for different volumes received by the receiving areas. For example, the waste liquid sensor may be located at a particular height on the wall, but one receiving area may have a deeper bottom wall than the other, thus requiring a larger amount of liquid to be received before liquid contacts the sensor.

In another aspect of the invention, a beverage forming apparatus includes a drip tray assembly arranged to receive waste liquid at the carafe receiving area. The drip tray assembly may include one or more holes shaped and arranged to align with a periphery of a base of a carafe at the carafe receiving area and to receive liquid flowing down an outer surface of carafe to the carafe base. As a result, liquid that overflows the carafe and flows down the outer surface of the carafe may enter the one or more holes for receipt by a waste liquid receiving area. For example, the one or more holes may have an arcuate shape and collectively extend over an arc of 90 to 180 degrees. This may allow the holes to align with a circular periphery of the carafe base such that liquid flowing down the outer surface of the carafe may enter the holes. As noted above, liquid that overflows the carafe may spill over a spout of the carafe, and since the carafe may be positioned at the carafe receiving area at a wide range of angles, liquid may flow down the carafe sides across a relatively wide range of angles. By having the holes span a wide arc, e.g., 90 degrees or more, overflow liquid may be reliably collected at the holes.

These and other aspects of the invention will be apparent from the following description and claims.

BRIEF DESCRIPTION OF DRAWINGS

Aspects of the invention are described below with reference to the following drawings in which like numerals reference like elements, and wherein:

FIG. 8 is a perspective view of the carafe located on a drip tray assembly at the carafe receiving area;

FIG. 9 is an exploded view of the carafe and drip tray assembly of the FIG. 8 embodiment;

DETAILED DESCRIPTION

It should be understood that aspects of the invention are described herein with reference to certain illustrative embodiment and the figures. The illustrative embodiments described herein are not necessarily intended to show all aspects of the invention, but rather are used to describe a few illustrative embodiments. Thus, aspects of the invention are not intended to be construed narrowly in view of the illustrative embodiments. In addition, it should be understood that aspects of the invention may be used alone or in any suitable combination with other aspects of the invention.

Figure 1:
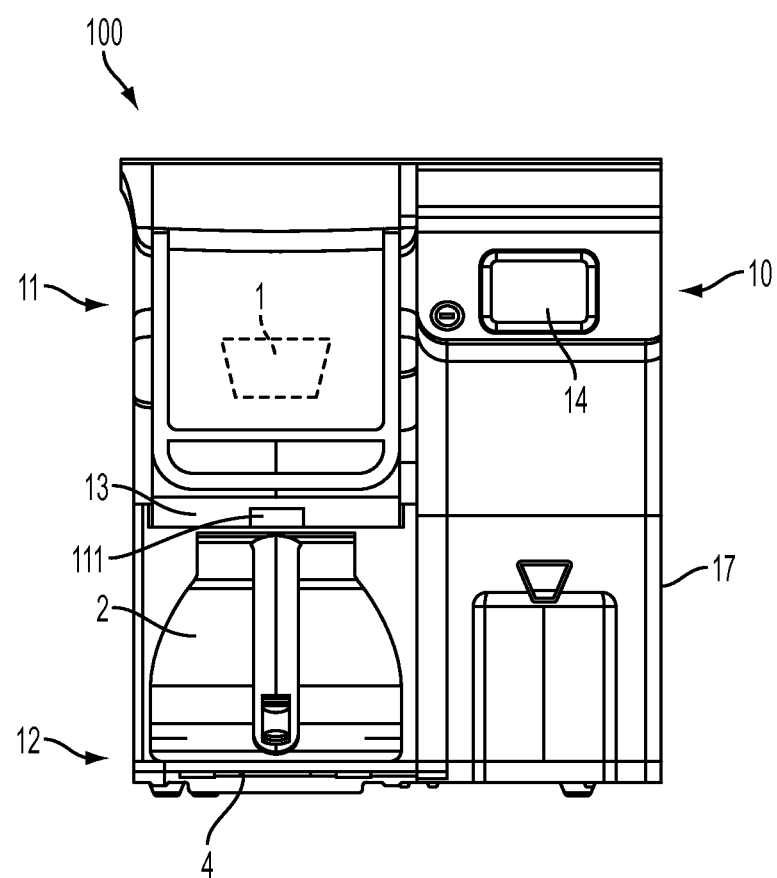
FIG. 1 is a front view of a beverage forming apparatus with a carafe located at a carafe receiving area of a beverage forming machine in an illustrative embodiment.

FIG. 1 shows a front view of a beverage forming apparatus 100 in an illustrative embodiment that incorporates aspects of the invention. Although the beverage forming apparatus 100 may be used to form any suitable beverage, such as tea, coffee, other infusion-type beverages, beverages formed from a liquid or powdered concentrate, soups, juices or other beverages made from dried materials, or other, in this illustrative embodiment, the apparatus 100 is arranged to form coffee or tea beverages. As is known in the art, a beverage cartridge 1 may be provided to the apparatus 100 and used to form a beverage that is deposited into a carafe 2. (As used herein, a carafe is any suitable container arranged to receive a dispensed beverage.) If used, the cartridge 1 may be manually or automatically placed in a beverage forming station 11 of a beverage forming machine 10. For example, the beverage forming station 11 may include a cartridge receiver that is exposed to receive the cartridge 1 when the user operates a handle or other actuator. With the cartridge 1 placed in the cartridge receiver, the actuator may be operated to at least partially enclose the cartridge 1, e.g., so that water or other precursor liquid can be introduced into the cartridge 1 to form a beverage. For example, with the cartridge 1 held in the beverage forming station 11, the cartridge 1 may be pierced to form inlet and outlet openings through which water or other precursor liquid enters the cartridge 1 and beverage that exits the cartridge 1, respectively. U.S. Pat. No. 8,361,527 describes a cartridge and a system for introducing liquid into the cartridge that may be used in an embodiment of this invention, and is hereby incorporated by reference in its entirety. Of course, aspects of the invention may be employed with any suitably arranged apparatus 100, including drip-type coffee brewers, carbonated beverage machines, and others arranged to form a beverage regardless of how the beverage is formed. For example, a cartridge 1 need not be used, and instead beverage material used to form a beverage may be provided to a mixing chamber or brew basket by a user or via a hopper system.

Figure 2:
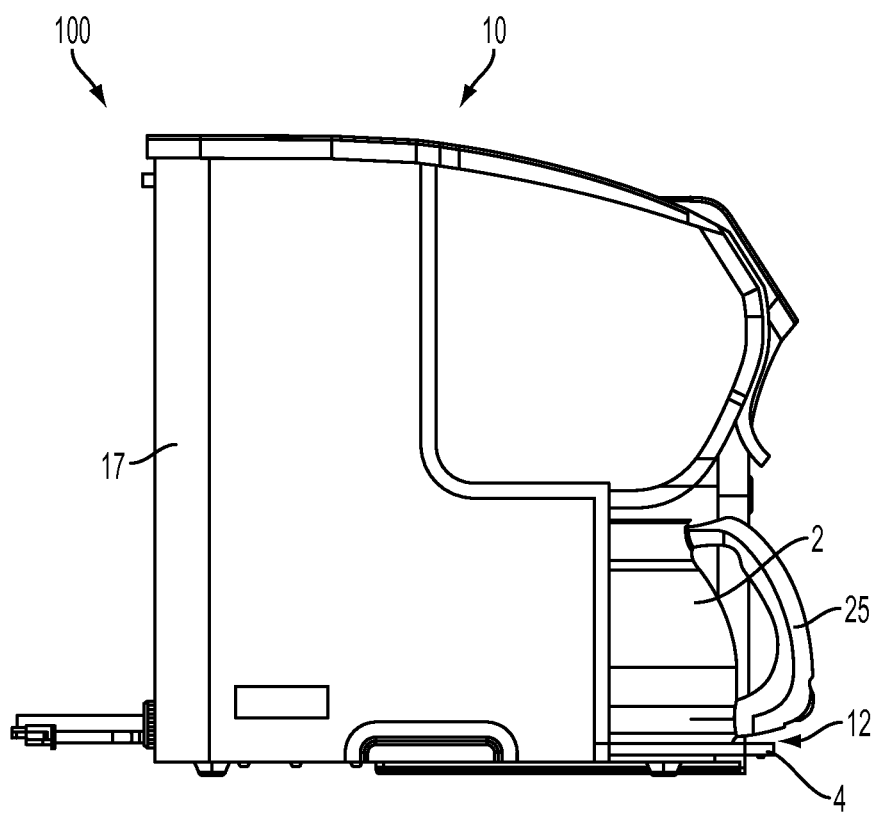
FIG. 2 is left side view of the FIG. 1 embodiment.
Figure 3:
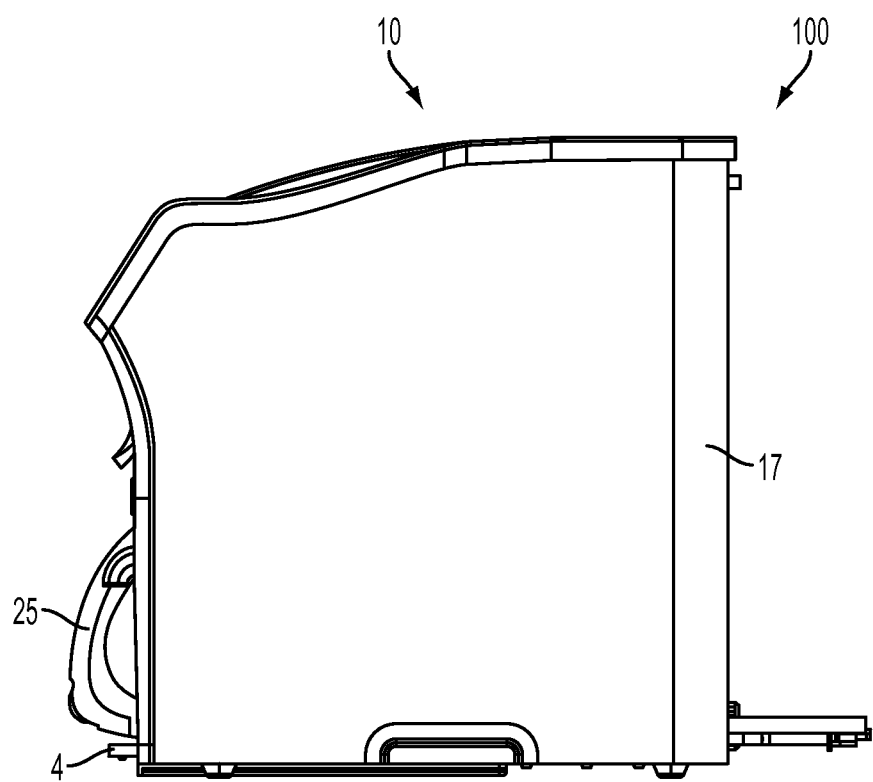
FIG. 3 is a right side view of the FIG. 1 embodiment.
Figure 4:
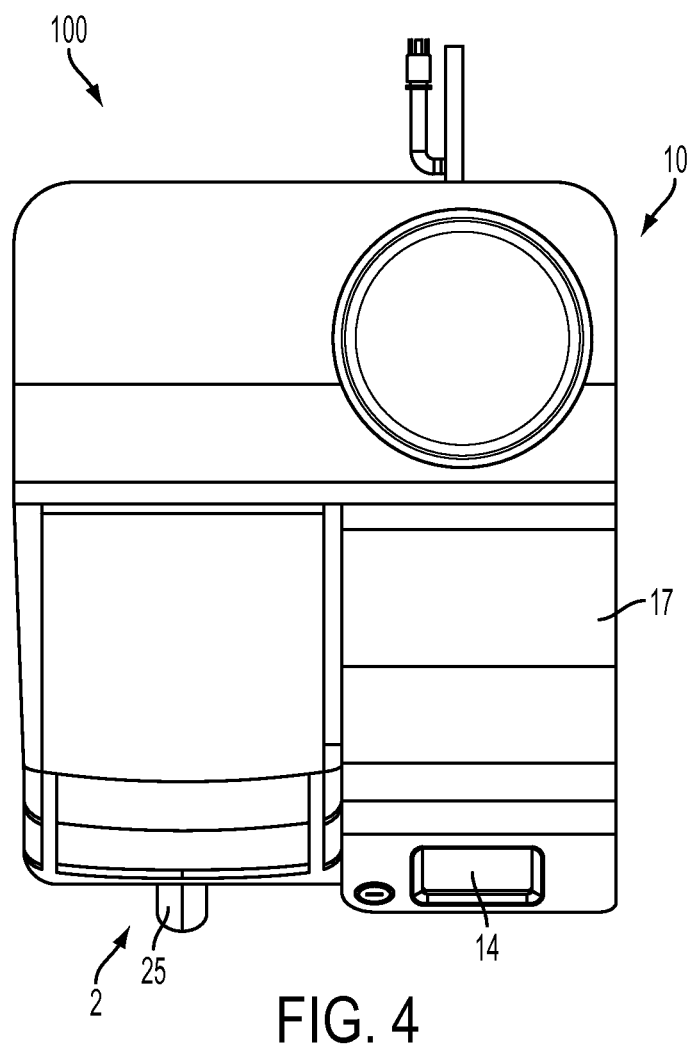
FIG. 4 is a top view of the FIG. 1 embodiment.

In this embodiment, the beverage forming machine 10 includes a housing 17 that houses and supports components of the machine 10, such as a user interface 14 used to control system operation, and defines a carafe receiving area 12 at which the carafe 2 is positionable to receive beverage dispensed by the machine 10. Thus, at the carafe receiving area 12, the carafe 2 is associated with the machine 10 to receive a dispensed beverage and may be supported by the housing 17. As can be seen in FIGS. 2-4, the carafe 2 may be received at the carafe receiving area 12 so that the carafe 2 is at least to partially surrounded by the housing 17. However, in other arrangements, the carafe 2 may be more exposed when at the carafe receiving area 12.

Although in this embodiment, the carafe 2 is at least partially surrounded by the housing 17 of the beverage forming machine 10, the carafe 2 is positionable at the carafe receiving area 12 in a plurality of rotational positions relative to the housing 17. For example, the carafe 2 may be placed at the carafe receiving area 12 at any of a number of rotational positions within a range of 45-120 degrees or more. That is, in this embodiment, the carafe 2 may be placed at carafe receiving area 12 such that the handle 25, which is attached at a side of the carafe 2 and is grippable by a user to manipulate the carafe, is located to the left or the right of that shown in FIG. 1. The rotational position of the carafe 2 relative to the housing 17 may be defined about a vertical axis, e.g., that is generally perpendicular to a surface that supports a bottom of the carafe 2 at the carafe receiving area 12. However, the carafe 2 may be arranged so that the carafe 2 can receive beverage dispensed by the machine 10 at any of the rotational positions. For example, the carafe 2 may have a beverage opening that receives dispensed beverage located at an axis of rotation of the carafe 2. In this way, although the carafe 2 may be rotated at the receiving area 12, the beverage opening may not move any substantial amount due to rotation. Accordingly, if a beverage outlet 111 of the machine 10 is located over the beverage opening, the beverage opening may be positioned to receive beverage regardless of the carafe's rotational position. Other arrangements are possible, however, such as one in which the carafe 2 includes a funnel that communicates with the beverage opening and that is wide enough to receive beverage dispensed by the machine 10 for all positions of the beverage opening.

In accordance with an aspect of the invention and as described in more detail below, the carafe 2 may be positioned over a drip tray assembly 4 that is arranged to receive waste liquid from the beverage outlet 111 and/or that overflows the carafe 2. In one embodiment, the drip tray assembly 4 may include first and second waste liquid receiving areas that are arranged to respectively receive waste liquid from the beverage outlet and from the outer surface of the carafe 2. (Beverage that overflows the carafe 2 will tend to flow downwardly along the outer surface of the carafe 2.) Different volumes of waste liquid received by the two different receiving areas may cause a waste liquid sensor to detect the presence of liquid, which may cause the beverage machine 10 to stop to dispensing or take other action. For example, the beverage outlet 111 may be expected to drip relatively small amounts of liquid after beverage production is complete and the carafe 2 is removed from the carafe receiving area 12. Thus, a first waste liquid receiving area of the drip tray assembly 4 that receives liquid from the beverage outlet 111 may be arranged so that a signal indicating the presence of waste liquid is provided only after a relatively large volume of liquid has been received into the first waste liquid receiving area, e.g., 2 ounces of liquid or more. On the other hand, no waste liquid may be expected to overflow the carafe 2 and be received at the second waste liquid receiving area, e.g., because of the carafe lid detection system described below and/or other systems that help prevent the dispensing of beverage unless the carafe 2 has suitable volume to receive the beverage. As a result, the drip tray assembly 4 may be arranged to provide a waste liquid presence signal if a relatively small volume of waste liquid is received at the second waste liquid receiving area, e.g., 2 ounces or less. Moreover, the drip tray assembly may be arranged to provide this capability while using a single waste liquid sensor. For example, the first and second waste liquid receiving areas may be separated from each other and arranged such that liquid flows from the first to the second waste liquid receiving area only after the first receiving area has received more than a threshold amount of liquid, e.g., 2 ounces or more. With a waste liquid sensor, such as a conductive probe, arranged in the second waste liquid receiving area, overflow liquid flowing from the first receiving area to the second area may be detected by the waste liquid sensor.

In another embodiment, the drip tray assembly may be arranged with one or more holes that are shaped and arranged to align with a periphery of the base of the carafe so that liquid flowing down along the outer surface of the carafe enters the one or more holes at the periphery of the carafe base. This may help ensure that the drip tray assembly quickly senses the presence of any liquid that overflows the carafe, allowing the beverage machine to stop operation or take other action. For example, the carafe base may have a circular shape, and the one or more holes may be arranged to span across an arcuate area, e.g., along an arc of 90 to 180 degrees or more (or less). This may help the drip tray assembly receive liquid flowing down a relatively large portion of the outer surface of the carafe 2, and may accommodate different angular positions of the carafe at the carafe receiving area 12. For example, liquid that overflows the carafe 2 to may spill over a pour spout of the carafe. As noted above, however, the carafe may be positionable at the carafe receiving area in a wide range of angular positions, which may locate the pour spout of the carafe at any of a wide range of positions. With the one or more holes arranged to span a relatively wide region along the carafe base periphery, liquid overflowing the carafe spout may be received by the drip tray assembly for the full range of possible spout locations.

In accordance with another aspect of the invention, the apparatus 100 may include a carafe lid detector 13 that is arranged to detect whether a lid that covers the beverage opening of the carafe 2 is in an open position or a closed position. Details regarding an illustrative embodiment of a lid detector 13 are described below, but a lid detector 13 could be arranged in any suitable way. For example, the lid detector 13 may include a camera or other imaging device that images a portion of the carafe 2 and uses image analysis to determine whether a lid of the carafe is in an open or closed position. In another embodiment, the lid detector 13 may include a probe that detects whether the lid is in an open or closed position. For example, the probe may be spring biased to move downwardly into the beverage opening of the carafe 2 if the lid is in an open position, but will be held in an upper position by the lid if the lid is in the closed position covering the beverage opening. In other arrangements, any suitable sensors may be used to detect a lid's presence, such as magnetic, inductive, resistive, capacitive or other sensors used to detect a magnetic or other physical characteristic of a lid. In yet another embodiment, a lid detector 13 may include an antenna or other component arranged to detect the presence of an RFID tag or other component on the lid that can be detected via radio frequency energy. The lid detector 13 may be arranged to actually detect the lid at two different positions, e.g., an open position and a closed position, or may be arranged to actually detect the lid in only one position, e.g., the open position or the closed position. In embodiments where the lid detector 13 is arranged to actually detect the lid at only one position, the detector or associated control circuit may infer that the lid is at the other position when the detector fails to detect the lid. For example, if the lid detector is arranged to detect the presence of the lid at the open position only, the control circuit may infer or assume that the lid is in the closed position if the lid detector fails to detect the presence of the lid. In any case, the lid detector is said to be able to detect whether the lid is in the open or closed position, even where the detector can only actually detect the presence of the lid at one position.

Figure 5:
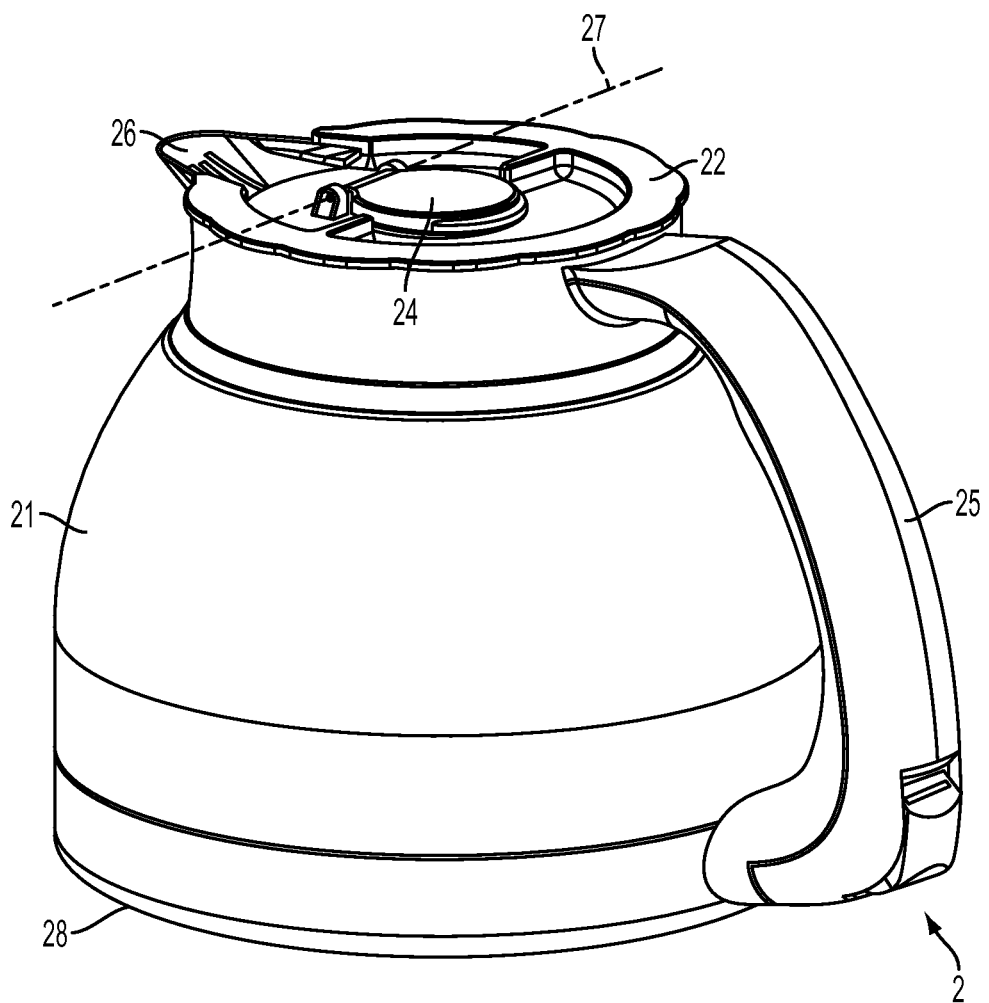
FIG. 5 is a perspective view of a carafe in an illustrative embodiment.

FIG. 5 shows a perspective view of a carafe 2 in an illustrative embodiment. The carafe 2 of FIG. 5 includes a body 21 with an outer surface and a base 28 that define an interior space that holds a beverage. The body 21 may be shaped, formed or otherwise constructed in any suitable way and of any suitable material or combination of materials. For example, the body 21 may be formed of a molded plastic material, metal, or other, and may be insulated or not. The body 21 defines a top opening that receives a cover 22. The cover 22 may be removable from the body 21, e.g., to allow easier cleaning of the interior space, and may engage the body in any suitable way. For example, the cover 22 may have a cylindrical portion that fits within the top opening of the body 21 and one or more gaskets (such as an o-ring positioned on the cylindrical portion) may help provide a water-tight seal between the cover 22 and the body 21 when the cylindrical portion is fitted into the top opening. In another embodiment, the cover 22 may threadedly engage with the body 21, and may include a gasket (such as a rubber washer positioned between a rim of the body 21 at the top opening and the cover 22) that provides a seal when the cover 22 is tightened to the body 21.

In this embodiment, the cover 22 includes a lid 24 that is pivotally mounted to the cover 22 so that the lid 24 can pivot about a horizontal axis 27 relative to the carafe 2. Thus, a user may flip the lid 24 forwardly, away from the handle 25, to expose the beverage opening 23 (not shown in FIG. 5, but located below the lid 24). Of course, the lid 24 may be movably mounted to the carafe 2 in other ways, such as by being made rotatable relative to the cover 22 about a vertical axis or other axis transverse to the horizontal plane, being made slidable on the cover 22 (e.g., along a linear track or channel in the cover 22), and others. Also, it is possible for the lid 24 to be removable from the carafe 2. For example, the lid 24 may be made as a plug that fits into the beverage opening 23 and is removable from the opening 23. A tether (such as a string or cord) may attach the lid 24 to the carafe 2 while allowing the lid 24 to be removed from the opening 23. In any case, the lid detector 13 may detect the presence or absence of the lid 24 to determine whether the opening 23 is exposed to receive beverage.

Figure 6:
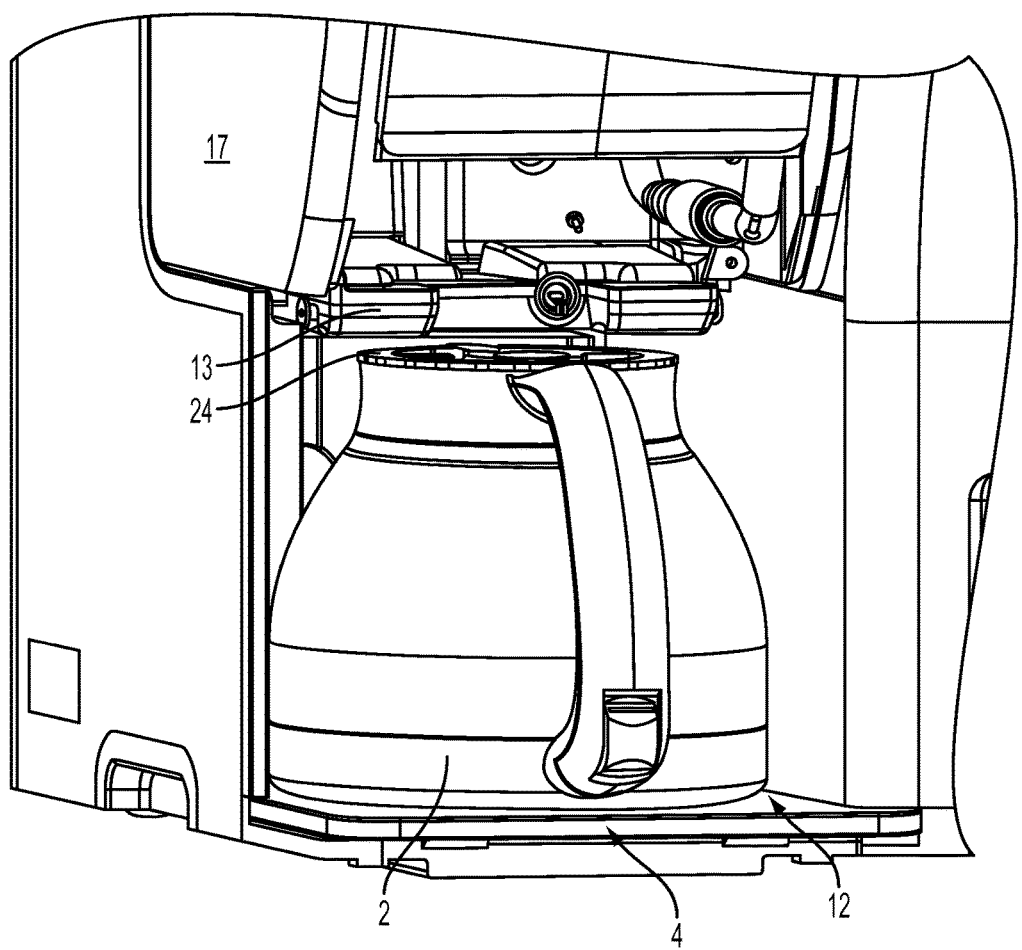
FIG. 6 is a close up perspective view of a carafe at a carafe receiving area.

In accordance with an aspect of the invention and as shown in FIG. 6 of this illustrative embodiment, the carafe 2 may be placed at the carafe receiving area 12 with the lid 24 in the open position and in the closed position. That is, whether the lid 24 covers or occludes the beverage opening 23 or not, the carafe 2 may be placed at the carafe receiving area 12. Thus, the carafe 2 may be stored in the carafe receiving area 12 regardless of the lid 24 position. As a result, the carafe 2 can be conveniently kept with the beverage forming machine 10 even if the lid 24 in a closed position, e.g., between servings of beverage from the carafe 2. Although the lid detector 13 may be positioned relatively close to the carafe 2, the arrangement of the lid 24 is such that the lid 24 does not interfere with the lid detector 13 or other part of the beverage forming machine 10 with the lid 24 in the open position. In this embodiment, the lid 24 may sit in a recess of the cover 22 and be relatively thin and flat such that with the lid 24 in the open position, the lid 24 lies within the recess and below a top edge of the cover 22.

Figure 7:
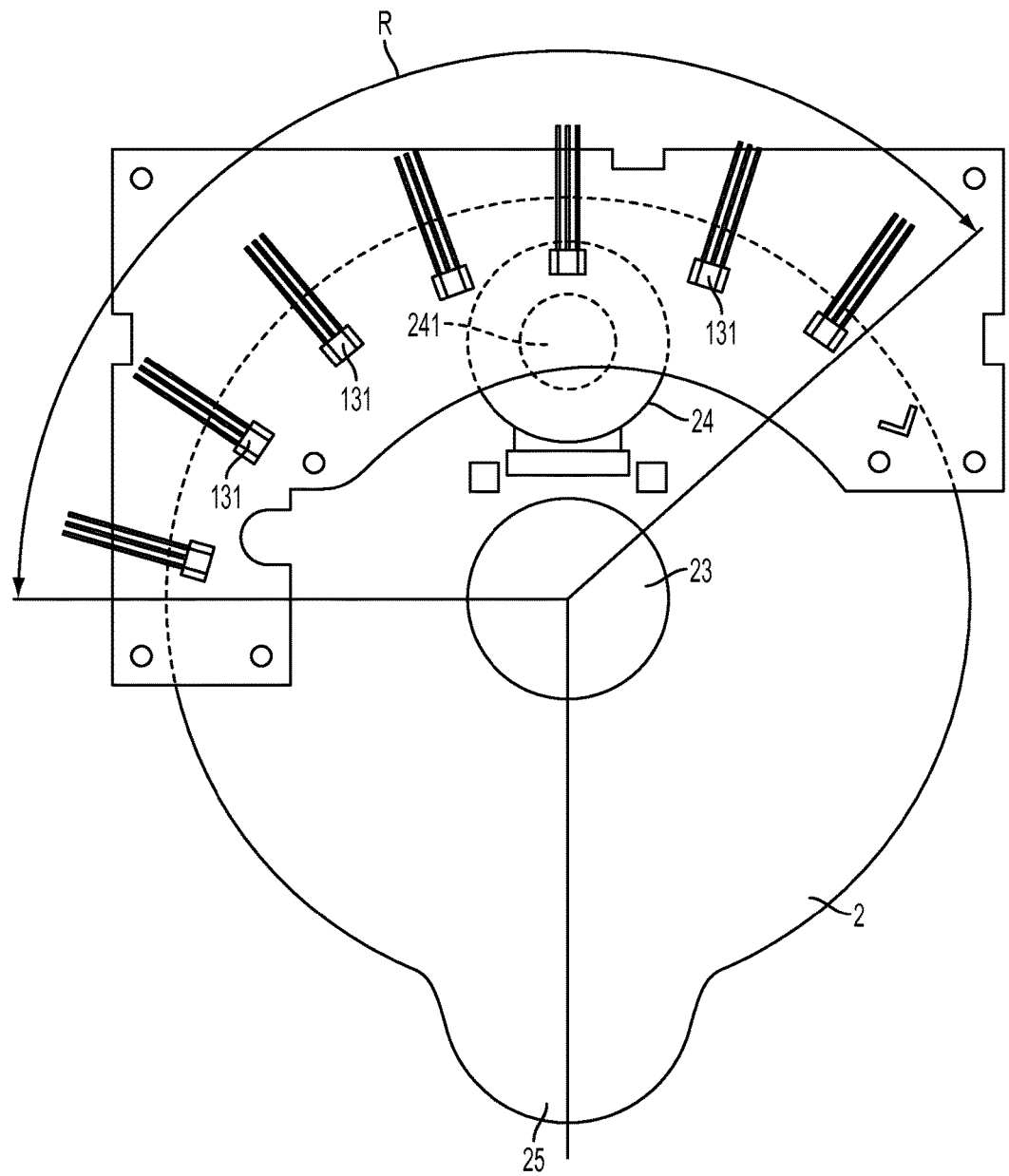
FIG. 7 is a schematic view of a carafe lid detector configuration in an illustrative embodiment.

FIG. 7 shows a schematic top view of the lid detector 13 and carafe 2 in an embodiment that illustrates how the lid 24 may be detected. In this embodiment, the lid detector 13 includes a plurality of sensor elements 131 arranged along an arc-shaped path above the carafe 2. In this embodiment, the sensor elements 131 are Hall effect sensors arranged to detect a magnet 241 attached to the lid 24 (e.g., the magnet 241 may be molded inside of the lid 24), but other sensor elements can be used depending on how the lid 24 is detected. In this example of FIG. 7, the lid 24 is in the open position and the beverage opening 23 is exposed to receive beverage. Thus, for example, the machine 10 could dispense beverage from an outlet positioned above the beverage opening 23 directly into the interior space of the carafe 2. With the lid 24 in the open position (e.g., flipped forward in the FIG. 5 embodiment toward the spout 26), one or more of the sensor elements 131 can detect the presence of the magnet 131, and thus the lid 24, thereby confirming that the lid 24 is in the open position and the carafe 2 is at the receiving position 12. However, if the lid 24 were in the closed position covering the opening 23, none of the sensor elements 131 will detect the magnet 131, indicating that the lid 24 is closed and/or that the carafe 2 is not at the receiving position 12. In another embodiment, the lid detector 13 may detect the presence of the lid 24 at the closed position, and thereby control system operation. In such a case, another sensor may be used to detect the presence of the carafe 2 at the receiving area 12, such as a reed switch that detects a magnet in the body 21 of the carafe 2, an optical sensor that detects an interruption in a light path caused by a portion of the carafe 2, and others.

In accordance with another aspect of the invention, the carafe 2 may be placed at the carafe receiving area 12 in any one of a plurality of different rotational positions, e.g., within a range of 45-180 degrees. In the example, of FIG. 7, the carafe 2 may be placed in rotational positions within a range R of about 120 degrees relative to the housing 17. That is, the carafe 2 may be placed at the carafe receiving area 12 with the lid 24 in the open position located under the sensor elements 131 anywhere in the range R of possible positions.

Limitation of the range of possible rotational positions of the carafe at the carafe receiving area 12 may be provided by mechanical interference of the handle 25 with one or more portions of the housing 16 or in other ways. For example, as can be seen in FIG. 1, the handle 25 may contact a portion of the housing 17 on the right side of the carafe receiving area 12 to limit counterclockwise rotation of the carafe 2 (as viewed from above) and may contact a portion of the housing 17 on the left side of the carafe receiving area 12 to limit clockwise rotation of the carafe 2. Limits on the carafe rotation may be provided in other ways, such as by other features formed on the carafe body 21, physical stops or other features on the cover 22, and others. Also, although in this embodiment the carafe 2 is limited to a number of rotational positions within a range of about 120 degrees, the carafe 2 may be limited to other ranges, such as 180 degrees or more, or less than 120 degrees. In yet another embodiment, the carafe 2 need not be limited to a range of positions, but instead may be placed in any one of a number of rotational positions within a 360 degree range.

FIG. 8 shows a perspective view of the carafe 2 on the drip tray assembly 4 separate from the housing 17. While in this illustrative embodiment, the drip tray assembly 4 is removable from the housing 17 (e.g., to allow discarding of collected liquid), the drip tray assembly 4 may be made fixed to the housing 17. When the drip tray assembly 4 is associated with the housing 17, the carafe 2 may be supported on the drip tray assembly 4 at the carafe receiving area 12. As can be seen in FIG. 9, the drip tray assembly includes an upper plate 46 that can be supported on a base 45. The base 45 defines first and second waste liquid receiving areas 41, 42 that are separated from each other by a wall 44. As noted above, the first waste liquid receiving area 41 may be arranged to receive liquid from the beverage outlet 111 (e.g., that drips when the carafe 2 is removed), and the second waste liquid receiving area 42 may receive waste liquid that overflows the carafe 2. A waste liquid sensor 43 may be located in the second waste liquid receiving area 42 as shown, and can detect the presence of liquid. In this embodiment, the waste liquid sensor 43 includes a pair of conductive probes that detect the presence of liquid by detecting a change in conductivity due to the liquid electrically connecting the probes to each other, although other liquid detection arrangements are possible, such as capacitive sensors, optical sensors, float switches, and so on. In this embodiment, the conductive probes are arranged at the bottom surface of the second waste liquid receiving area 42 so that a relatively small amount of liquid can be detected. Of course, other arrangements are possible, e.g., that detect the presence of liquid for larger volumes.

The upper plate 46 defines openings through which liquid may enter the first and second waste liquid receiving areas 41, 42. In this embodiment, a hole 47 may be arranged to receive liquid directly from the beverage outlet 111, e.g., liquid that drips from the beverage outlet 111 may fall along a path 111a through the hole 47 and into the first waste liquid receiving area 41. In addition, the upper plate 46 defines one or more holes 48 that are arranged to receive liquid at a periphery of the carafe base 28. In this embodiment, the holes 48 are arranged to have an arcuate shape and together the holes 48 span an arc of about 180 degrees. Of course other arrangements are possible, such as holes covering an arc of 90 to 180 degrees or more (or less). Also, the holes 48 need not have an arcuate shape, but may be circular or arranged in other ways and yet still align with a periphery of the carafe base 28.

In accordance with an aspect of the invention, the holes 48 may be arranged to receive liquid that flows down an outer surface of the carafe 2 as the liquid reaches the periphery of the carafe base 28. In this way, liquid that overflows the carafe 2 may enter the second waste liquid receiving area 42 via the holes 48 and be sensed by the waste liquid sensor 43. Thus, liquid overflowing the carafe 2 may be prevented from entering the hole 47, and instead enter the drip tray assembly only (or at least preferentially) at the holes 48. This may allow for rapid sensing of a carafe overflow condition because the waste liquid sensor 43 may be arranged to detect the presence of liquid for a relatively small volume received by the second waste liquid receiving area 42, e.g., 2 ounces or less. This is in contrast to the first waste liquid receiving area 41 which may be arranged to receive a relatively larger volume of waste liquid before the liquid is sensed by the waste liquid sensor 43. That is, the first waste liquid receiving area 41 may be expected to receive at least some waste liquid, e.g., by way of a normal amount of dripping at the beverage outlet 111 that does not represent a machine problem or malfunction. Thus, the first waste liquid receiving area 41 may collect liquid up to a desired volume, such as 2 ounces or more, before liquid flows from the first waste liquid receiving area 41 into the second waste liquid receiving area 42 and causing the waste liquid sensor 43 to detect its presence.

While in this embodiment, the first and second waste liquid receiving areas 41, 42 are separated by a wall 44 that extends upwardly from a surface of the base 45, other arrangements for fluidly connecting the first and second waste liquid receiving areas 41, 42 are possible, such as a siphon, a check valve that opens when a height of liquid in the first waste liquid receiving area 41 exceeds a threshold, and others. Moreover, it is possible for each of the waste liquid receiving areas 41, 42 to have its own waste liquid sensor 43 that are arranged to detect the presence of liquid for different amounts of received liquid. Thus, the first and second waste liquid receiving areas 41, 42 need not fluidly communicate to provide different waste liquid sensing functions. For example, a conductive probe sensor may be provided in the wall 44 and arranged to contact liquid in both the first and second waste liquid receiving areas 41, 42. However, the first waste liquid receiving area 41 may be deeper than the second waste liquid receiving area 42, thus requiring a larger volume of liquid in the first waste liquid receiving area 41 before the conductive probe sensor detects liquid.

Figure 10:
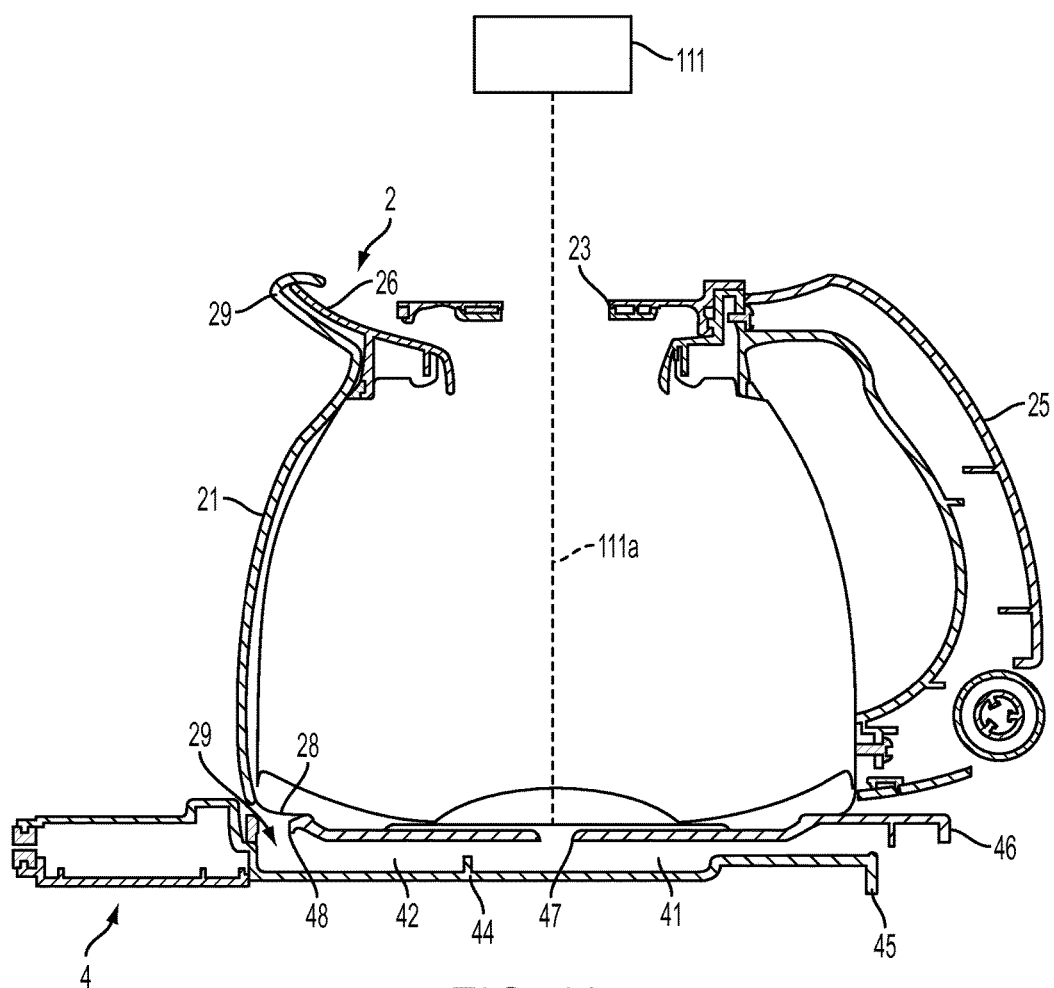
FIG. 10 is a cross sectional view along the line 10-10 of FIG. 8.

FIG. 10 shows a cross sectional view along the line 10-10 in FIG. 8 and arrow 29 shows how liquid that overflows the carafe spout 26 will tend to flow downwardly along an outer surface of the body 21 to a periphery of the carafe base 28. By locating the hole(s) 48 to receive liquid at the periphery of the base 28, any over flow liquid will flow into the second waste liquid receiving area 42. If the waste liquid sensor 43 is arranged to sense liquid for relatively small volumes received by the second waste liquid receiving area 42, the overflow condition can be rapidly sensed and the condition detected by the beverage machine control circuitry. This can allow the beverage machine 10 to stop beverage dispensing until the overflow condition is remedied, e.g., by replacing the carafe 2 with an empty carafe and/or opening the carafe lid 24, or take other action.

FIG. 10 also shows how liquid that exits the beverage outlet 111 may directly enter the opening 47 and be received by the first waste liquid receiving area 41 if the carafe 2 is not at the carafe receiving area 12. Of course, other arrangements are possible and liquid need not pass directly from the beverage outlet 111 through the opening 47 and into the first waste liquid receiving area 41. Instead, the liquid may impact a portion of the upper plate 46 and then flow into the first waste liquid receiving area 41. FIG. 10 also shows how liquid may collect in the first waste liquid receiving area 41 until a particular threshold volume is reached, at which time the liquid may flow over the wall 44 and into the second waste liquid receiving area 42. As a result, once the liquid in the first waste liquid receiving area 41 reaches the threshold volume and begins to flow into the second waste liquid receiving area 42, the presence of the liquid may be relatively quickly sensed.

Figure 11:
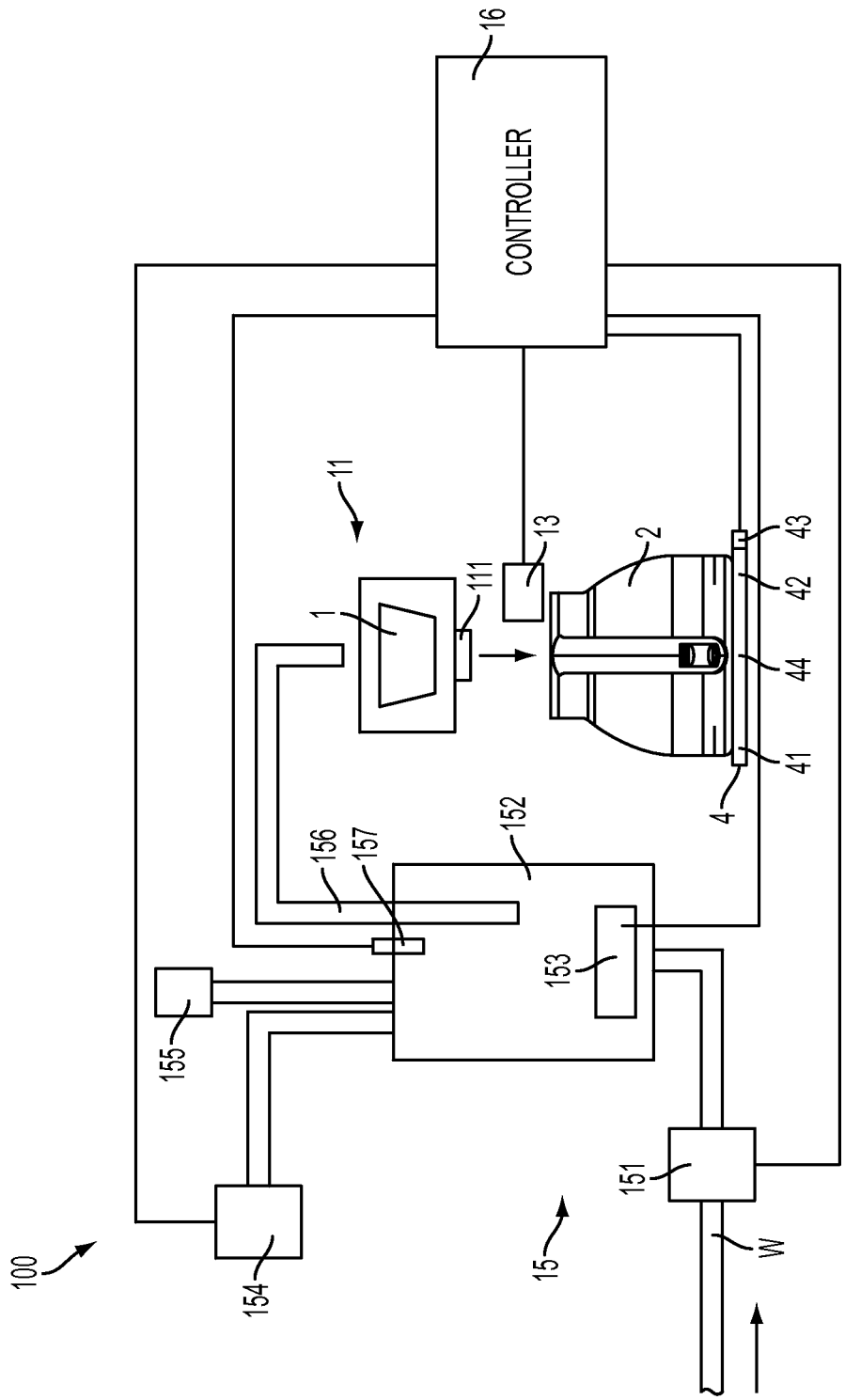
FIG. 11 a schematic diagram of components of a beverage forming apparatus in an illustrative embodiment.

FIG. 11 shows a schematic block diagram of various components that may be included in a beverage forming apparatus 100 in one illustrative embodiment. Those of skill in the art will appreciate that a beverage forming apparatus 100 may be configured in a variety of different ways, and thus aspects of the invention should not be narrowly interpreted as relating only to one type of beverage forming apparatus. Water or other precursor liquid may be provided by a liquid supply 15 to mix with a beverage material at a beverage forming station 11. The beverage material (such as coffee grounds, tea leaves, a powdered drink mix, etc.) may be provided in a cartridge 1, or not, and beverage produced by mixing the liquid with the beverage material may be dispensed into the carafe 2. The liquid supply 15 in this embodiment includes a valve 151 that is coupled to a source W that provides liquid from a storage tank, a mains water supply or other source. The valve 151 is controlled by a control circuit 16 to open and close to provide a desired volume of liquid to a tank 152. For example, if the tank 152 is empty, the valve 151 may be opened until a conductive probe or other water level sensor 157 provides a signal to the control circuit 16 that indicates when liquid arrives near or at a top of the tank 152. In response to detecting liquid at the sensor 157, the control circuit 16 may close the valve 151. Of course, other arrangements for providing liquid to the tank 152 are possible, such as by a pump (e.g., a centrifugal pump, piston pump, solenoid pump, diaphragm pump, etc.). Other optional features, such as a vent 155 which can be opened or closed to vent the tank 152, a check valve or other flow controller that can prevent backflow in the conduit between the source W and the tank 152, or other features may be included. In this embodiment, the vent 155 is not controlled by the control circuit 16, but remains always open with an orifice of suitable size to allow venting for filling of the tank 152, and pressure buildup in the tank 152 to allow liquid delivery. Also, control of a volume of liquid provided to the tank 152 may be performed in other ways, such as opening the valve 151 for a defined period of time, running a pump for a predetermined time, detecting a flow rate or volume of liquid entering the tank 152 (e.g., using a flow meter), operating a pump for a desired number of cycles (such as where the pump is arranged to deliver a known volume of liquid for each cycle), detecting a pressure rise in the tank 152 using a pressure sensor, or using any other viable technique.

Liquid in the tank 152 may be heated by way of a heating element 153 whose operation is controlled by the control circuit 16 using input from a temperature sensor or other suitable input. Of course, heating of the liquid is not necessary, and instead (or additionally) the apparatus 100 may include a chiller to cool the liquid, a carbonator to carbonate the liquid, or other system to otherwise condition the liquid. In this embodiment, liquid in the tank 152 may be dispensed via a conduit 156 to the beverage forming station 11. The liquid may be discharged from the tank 152 by an air pump 154 operating to force air into the tank 152 to pressurize the tank and force liquid to flow in the conduit 156 to the beverage forming station 11. Again, liquid may be caused to flow from the tank 152 to the beverage forming station 11 in other ways, such as by opening the valve 151 to force additional unheated liquid into the tank 152, thereby displacing water out of the tank 152 and into the conduit 156. A flow sensor or other suitable device may be used to determine the amount of liquid delivered to the tank 152, and thus the amount of liquid delivered to the beverage forming station 11. Alternately, a pump may be used to force additional liquid into the tank 152, or to pump liquid from the tank 152 to the forming station 11. For example, a specified volume of liquid may be delivered to the forming station 152 by operating a pump to deliver the specified volume of liquid from the source W to the tank 152, e.g., a diaphragm pump may deliver 5 ml for each pump stroke, and thus 100 ml of liquid may be delivered to the tank 152 by operating the pump through 20 pump cycles. Liquid may be introduced to the beverage forming station 11 at any suitable pressure, e.g., 1-2 psi, 30-50 psi, or higher. Although in this embodiment the conduit 156 is shown as extending into the tank 152, the conduit 156 could be arranged in other suitable ways. For example, the outlet of the heater tank 152 to the conduit 156 could be arranged at an extreme top of the tank 152, or in other ways. The conduit 156 may include a check valve or other flow controller, e.g., to help prevent backflow in the tank conduit 156 from the forming station 11.

The beverage forming station 11 may use any beverage making ingredient, such as ground coffee, tea, a flavored drink mix, or other beverage medium, e.g., contained in a cartridge 1 or not. Alternately, the beverage forming station 11 may function simply as an outlet for heated, cooled or otherwise conditioned water or other liquid, e.g., where a beverage medium is contained in the carafe 2. Once liquid delivery from the tank 156 to the station 11 is complete, the air pump 154 (or other air pump) may be operated to force air into the conduit 156 to purge liquid from the beverage forming station 11, at least to some extent.

Operation of the valve 151, air pump 154 and other components of the apparatus 100 may be controlled by the control circuit 16, e.g., which may include a programmed processor and/or other data processing device along with suitable software or other operating instructions, one or more memories (including non-transient storage media that may store software and/or other operating instructions), temperature and liquid level sensors, pressure sensors, input/output interfaces, communication buses or other links, a display, switches, relays, triacs, or other components necessary to perform desired input/output or other functions.

As noted above, the beverage forming apparatus 100 may include a carafe lid detector 13 that detects whether the carafe lid is in an open or closed position. The detector 13 may detect the presence or absence of the lid 24, and thus detect whether the lid 24 is in the open or closed position. If the lid 24 is detected to be in the closed position, the control circuit 24 may prevent the apparatus 100 from operating to dispense a beverage to the carafe 2. Note that the apparatus 100 need not necessarily be prevented from operating to produce a beverage if the carafe lid is detected to be closed or is not detected to be open. For example, the apparatus 100 may operate to produce a beverage and store the beverage in a holding tank if the carafe lid 24 is closed. If the carafe lid 24 is detected to be in the open position, the control circuit 16 may then control the apparatus 100 to dispense the stored beverage from the holding tank to the carafe 2. As described above, the lid detector 13 may include one or more Hall effect sensors, optical detectors, reed switches, microswitches that are closed by physical contact with the carafe lid, and/or other components to detect the presence or absence of the lid 24. The control circuitry 16 may be arranged to suitably interpret any type of signal provided by the detector 13 to determine the lid open/closed state.

The control circuit 16 can also use the waste liquid sensor 43 to control operation of the beverage machine 10, e.g., to detect that beverage is overflowing the carafe 2 and/or that the carafe is not in place at the carafe receiving area 12 during beverage production and/or that liquid is undesirably exiting the beverage outlet 111. For example, if a carafe 2 having insufficient volume to receive the beverage being produced is placed at the carafe receiving area 12, beverage may overflow and flow down the carafe outer surface for receipt by the second waste liquid receiving area 42. Upon detection of the liquid by the waste liquid sensor 43, beverage dispensing may be stopped, and the problem identified to a user, e.g., by a visual and/or audible display indicating the an overflow condition has been sensed. Also, if a user commands the beverage machine 10 to dispense beverage without a carafe 2 located at the carafe receiving area 12, the dispensed beverage may enter the first waste liquid receiving area 41 and be detected by the waste liquid sensor 43. In response, the control circuit 16 may pause beverage dispensing until a carafe 2 is placed at the carafe receiving area 12. Although not shown, the control circuit 16 may also include a load cell or other device to detect a weight of a carafe 2 at the carafe receiving area 12. The weight of the carafe 2 may be used to determine whether a carafe 2 is positioned at the carafe receiving area 12 and/or whether the carafe 2 has sufficient empty volume to receive beverage to be dispensed. Other sensors can be used to detect an amount of empty volume of the carafe 2 (or the presence of the carafe 2), such as capacitive, conductive, or optical sensors or other devices.

According to an aspect of the invention, a method for controlling a beverage forming apparatus may include placing a carafe at a carafe receiving area of a beverage forming machine where the carafe has an interior space for holding a beverage, an opening through which beverage is dispensable into the interior space, and a lid that is movable between an open position in which the opening is uncovered by the lid and a closed position in which the opening is covered by the lid. The carafe may be placed at the carafe receiving area with the lid in the open or closed position, and in some embodiments, may be placed at the carafe receiving area in any one of a plurality of rotational positions with a range of 45-180 degrees. In one specific embodiment, the carafe may be placed in any one of a plurality of different rotational positions in a 120 degree range relative to a beverage machine housing.

Next, the lid may be detected to be in the open or closed position with the carafe at the carafe receiving area. In some embodiments, the lid position may be detected by detecting whether the lid is in the open position, while in others lid position may be detected by detecting whether the lid is at the closed position. For example, if the lid is not detected at the open position, a determination may be made that the lid is in the closed position. In embodiments where lid position is inferred by the failure to detect the presence of the lid, an additional detector may be required, e.g., to detect the presence of the carafe at the carafe receiving area. In yet other embodiments, the presence of the lid may be detected at either the open or closed position.

If the lid is detected to be in the closed position with the carafe at the carafe receiving area, operation of the beverage forming apparatus to dispense a beverage may be prevented. For example, control circuitry of the beverage forming apparatus may determine based on the detection of the carafe lid at the closed position (e.g., by a failure to detect the lid at an open position), that a beverage should not be produced and dispensed into the carafe. The control circuit may provide a prompt to the user, e.g., at a display of a user interface, that the carafe lid is closed and that the user should open the lid and re-place the carafe to enable beverage production. In another embodiment, the control circuit may take automatic action to move the lid to the open position, e.g., by using a magnetic device to attract the lid and move it to the open position. In some embodiments, the carafe includes a body and the lid includes a structure that is pivotally mounted to the body such that the lid is pivotable relative to the body between the open and closed positions. For example, the lid may be pivotable about a horizontal axis, whereas the carafe may be adjustable in position at the carafe receiving area relative to the housing about a vertical axis. Thus, in some embodiments, adjusting a rotational position of the carafe at the carafe receiving area may move the lid along an arc-shaped path relative to the lid detector. Accordingly, the lid detector may be arranged to detect the lid in any one of a plurality of positions of the lid along the arc-shaped path.

In another aspect of the invention, a method for controlling a beverage forming apparatus may include receiving waste liquid from a first source, such as liquid dripping from a beverage outlet, or receiving waste liquid from a second source, such as liquid overflowing a carafe. Waste liquid from the first source may be detected in response to receipt of a first volume, and waste liquid from the second source may be detected in response to receipt of a second volume which is smaller than the first volume. In some embodiments, a single waste liquid sensor may be used, and liquid from the first source may flow from a first receiving area to a second receiving area when the liquid from the first source reaches a threshold volume. In response to detecting waste liquid from the first or second source, beverage dispensing may be stopped or other action, such as notifying a user of the detected condition.

In another aspect of the invention, a method for controlling a beverage forming apparatus may include providing one or more holes arranged at a periphery of a base of a carafe, and receiving liquid flowing down a side of the carafe when the liquid reaches the periphery of the carafe base. The liquid may be received into a waste liquid receiving area of a drip tray assembly, and the presence of the liquid may be detected by a waste liquid sensor. The one or more holes may be arranged to span an arc of 45 degrees or more, e.g., 180 degrees, such that waste liquid may be received at the periphery of a carafe having a circular base.

For those systems employing a cartridge 1, once a cartridge is located in the beverage forming station 11, the beverage forming apparatus 100 may use the cartridge 1 to form a beverage. For example, one or more inlet needles may pierce the cartridge 1 (e.g., a lid of the cartridge) so as to inject heated water or other liquid into the cartridge 1. The injected liquid may form the desired beverage or a beverage precursor by mixing with beverage medium in the cartridge 1. The apparatus 100 may also include one or more outlet needles or other elements to puncture or pierce the cartridge 1 at an outlet side (e.g., at the lid of the cartridge) to permit the formed beverage to exit the cartridge 1. Other inlet/outlet piercing arrangements are possible, such as multiple needles, a shower head, a non-hollow needle, a cone, a pyramid, a knife, a blade, etc. Other arrangements for an inlet or outlet are possible however, e.g., the cartridge may have a permeable portion that allows water to flow into and/or beverage to exit cartridge 1. Also, there is no requirement that an inlet and/or an outlet pierce a cartridge to provide liquid to, or receive beverage from, a cartridge. Instead, communication with a cartridge may be performed using any suitable ports or other features.

While aspects of the invention may be used with any suitable cartridge, or no cartridge at all, some cartridges may include features that enhance the operation of a beverage forming apparatus 100. As is known in the art, the cartridge 1 may take any suitable form such as those commonly known as a sachet, pod, capsule, container or other. For example, the cartridge 1 may include an impermeable outer covering within which is housed a beverage medium, such as roasted and ground coffee or other. The cartridge 1 may also include a filter so that a beverage formed by interaction of the liquid with the beverage medium passes through the filter before being dispensed into a carafe 2. As will be understood by those of skill in the art, cartridges in the form of a pod (e.g., having opposed layers of permeable filter paper encapsulating a beverage medium) may use the outer portion of the cartridge 1 to filter the beverage formed. The cartridge 1 in this example may be used in a beverage machine to form any suitable beverage such as tea, coffee, other infusion-type beverages, beverages formed from a liquid or powdered concentrate, etc. Thus, the cartridge 1 may contain any suitable beverage medium, e.g., ground coffee, tea leaves, dry herbal tea, powdered beverage concentrate, dried fruit extract or powder, powdered or liquid concentrated bouillon or other soup, powdered or liquid medicinal materials (such as powdered vitamins, drugs or other pharmaceuticals, nutriaceuticals, etc.), and/or other beverage-making material (such as powdered milk or other creamers, sweeteners, thickeners, flavorings, and so on). In one illustrative embodiment, the cartridge 1 contains a beverage medium that is configured for use with a machine that forms coffee and/or tea beverages, however, aspects of the invention are not limited in this respect.

As used herein, "beverage" refers to a liquid substance intended for drinking that is formed when a liquid interacts with a beverage medium. Thus, beverage refers to a liquid that is ready for consumption, e.g., is dispensed into a cup and ready for drinking, as well as a liquid that will undergo other processes or treatments, such as filtering or the addition of flavorings, creamer, sweeteners, another beverage, etc., before being consumed.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A beverage forming apparatus comprising:
a housing having a beverage outlet and carafe receiving area to receive a carafe at which the carafe is associated with the housing to receive a beverage dispensed from the beverage outlet;
a drip tray assembly arranged to receive waste liquid at the carafe receiving area, the drip tray assembly including a waste liquid sensor and first and second waste liquid receiving areas each having a corresponding opening, the first waste liquid receiving area arranged to receive waste liquid falling from the beverage outlet, the waste liquid sensor being arranged to detect the presence of waste liquid in response to a first volume of liquid received at the first waste liquid receiving area and to detect the presence of waste liquid in response to a second volume of liquid received at the second waste liquid receiving area, the first and second volumes being different from each other;
a beverage forming station supported by the housing and arranged to combine a precursor liquid with a beverage material to form the beverage that is dispensed from the beverage outlet;
a precursor liquid supply system supported by the housing for providing the precursor liquid to the beverage forming station; and
a control circuit arranged to control the liquid supply system to deliver the precursor liquid to the beverage forming station to dispense a beverage.

2. The apparatus of claim 1, wherein the first and second waste liquid receiving areas are separated from each other by a wall, and the waste liquid sensor is located in the second waste liquid receiving area.

3. The apparatus of claim 1, wherein the first volume is larger than the second volume.

4. The apparatus of claim 1, wherein the second waste liquid receiving area is arranged to receive liquid flowing downwardly along sides of a carafe positioned at the carafe receiving area.

5. The apparatus of claim 1, wherein the opening of the first waste liquid receiving area includes a hole located directly below the beverage outlet.

6. The apparatus of claim 1, wherein the drip tray apparatus is removable from the housing.

7. The apparatus of claim 1, wherein the waste liquid sensor includes at least one conductive probe arranged to detect a presence of liquid in the drip tray assembly.

8. The apparatus of claim 1, wherein the drip tray assembly includes a base that defines the first and second waste liquid receiving areas.

9. The apparatus of claim 8, wherein the drip tray assembly includes a plate arranged over the base and that includes the openings for the first and second waste liquid receiving areas through which liquid enters the first and second waste liquid receiving areas.

10. The apparatus of claim 8, wherein the base includes a wall that extends upwardly from an upper surface of the base and that separates the first and second waste liquid receiving areas.

11. The apparatus of claim 10, wherein the waste liquid sensor is arranged in the second waste liquid receiving area of the base, and liquid in the first waste receiving area flows over the wall and into the second waste receiving area to be detected by the waste liquid sensor.

12. A beverage forming apparatus comprising:
a housing having a beverage outlet and carafe receiving area to receive a carafe at which the carafe is associated with the housing to receive a beverage dispensed from the beverage outlet;
a drip tray assembly arranged to receive waste liquid at the carafe receiving area, the drip tray assembly including a waste liquid sensor and first and second waste liquid receiving areas separated from each other such that liquid flows from the first to the second waste liquid receiving area when a volume of liquid in the first receiving area exceeds a threshold, the first waste liquid receiving area arranged to receive waste liquid from the beverage outlet, the waste liquid sensor being arranged in the second waste liquid receiving area to detect the presence of waste liquid;
a beverage forming station supported by the housing and arranged to combine a precursor liquid with a beverage material to form the beverage that is dispensed from the beverage outlet;
a precursor liquid supply system supported by the housing for providing the precursor liquid to the beverage forming station; and
a control circuit arranged to control the liquid supply system to deliver the precursor liquid to the beverage forming station to dispense a beverage.

13. The apparatus of claim 12, wherein the drip tray includes a first opening through which liquid enters the first waste liquid receiving area.

14. The apparatus of claim 13, wherein the drip tray includes a second opening through which liquid directly enters the second waste liquid receiving area.

15. The apparatus of claim 14, wherein the second opening of the second waste liquid receiving area includes one or more holes arranged to receive liquid flowing downwardly along sides of a carafe positioned at the carafe receiving area.

16. The apparatus of claim 13, wherein the opening of the first waste liquid receiving area includes a hole located directly below the beverage outlet.

17. The apparatus of claim 12, wherein the first and second waste liquid receiving areas are separated from each other by a wall, and the waste liquid flows over the wall from the first to the second waste liquid receiving area.

18. The apparatus of claim 12, wherein the drip tray apparatus is removable from the housing.

19. The apparatus of claim 12, wherein the waste liquid sensor includes at least one conductive probe arranged to detect a presence of liquid in the drip tray assembly.

20. The apparatus of claim 12, wherein the drip tray assembly includes a base that defines the first and second waste liquid receiving areas.

21. The apparatus of claim 20, wherein the drip tray assembly includes a plate arranged over the base and that includes openings for the first and second waste liquid receiving areas through which liquid enters the first and second waste liquid receiving areas.

22. The apparatus of claim 20, wherein the base includes a wall that extends upwardly from an upper surface of the base and that separates the first and second waste liquid receiving areas.

23. The apparatus of claim 22, wherein the waste liquid sensor is arranged in the second waste liquid receiving area of the base, and liquid in the first waste receiving area flows over the wall and into the second waste receiving area to be detected by the waste liquid sensor.

24. A beverage forming apparatus comprising:
a housing having a beverage outlet and carafe receiving area to receive a carafe at which the carafe is associated with the housing to receive beverage dispensed from the beverage outlet;
a drip tray assembly arranged to receive waste liquid at the carafe receiving area, the drip tray assembly including one or more holes positioned to receive liquid at a periphery of a base of a carafe at the carafe receiving area, wherein the liquid comprises liquid flowing down an outer surface of the carafe to the carafe base;
a beverage forming station supported by the housing and arranged to combine a precursor liquid with a beverage material to form a beverage that is dispensed from the beverage outlet;
a precursor liquid supply system supported by the housing for providing precursor liquid to the beverage forming station; and
a control circuit arranged to control the liquid supply system to deliver precursor liquid to the beverage forming station to dispense a beverage.

25. The assembly of claim 24, wherein the drip tray assembly includes first and second waste liquid receiving areas separated from each other, the first waste receiving area being arranged to receive waste liquid directly from the beverage outlet, and the second waste receiving area being arranged to receive liquid from the one or more holes.

26. The assembly of claim 25, wherein the first and second waste liquid receiving areas are arranged such that liquid flows from the first to the second waste liquid receiving area when a volume of liquid in the first receiving area exceeds a threshold.

27. The assembly of claim 26, further comprising a waste liquid sensor arranged in the second waste liquid receiving area to detect the presence of waste liquid.

28. The apparatus of claim 27, wherein the waste liquid sensor includes at least one conductive probe arranged to detect a presence of liquid in the drip tray assembly.

29. The apparatus of claim 24, wherein the drip tray apparatus is removable from the housing.

30. The apparatus of claim 24, wherein the one or more holes include holes having an arcuate shape that collectively extend over an arc of 90 to 180 degrees.

31. The apparatus of claim 24, wherein the drip tray apparatus includes a base that defines a waste liquid receiving area arranged to receive liquid from the one or more holes.

32. The apparatus of claim 31, wherein the drip tray apparatus includes an upper plate arranged over the base and that includes the one or more holes through which liquid enters the waste liquid receiving area.

33. The apparatus of claim 32, wherein the base includes a wall that extends upwardly from an upper surface of the base and that separates the waste liquid receiving area into first and second waste liquid receiving areas.

34. The apparatus of claim 33, further comprising a waste liquid sensor arranged in the second waste liquid receiving area to detect the presence of waste liquid, wherein the second waste liquid receiving area receives liquid from the one or more holes.

35. The apparatus of claim 34, wherein the upper plate includes an opening located directly below the beverage outlet, and liquid entering the opening is received by the first waste liquid receiving area.

36. The apparatus of claim 35, wherein the wall is arranged such that waste liquid flows over the wall from the first to the second waste liquid receiving area for detection by the waste liquid sensor.

* * * * *

UNITED STATES PATENT AND TRADEMARK OFFICE
CERTIFICATE OF CORRECTION

PATENT NO. : 9,788,685 B2
APPLICATION NO. : 14/326550
DATED : October 17, 2017
INVENTOR(S) : Nikolas Kastor Page 1 of 1

It is certified that error appears in the above-identified patent and that said Letters Patent is hereby corrected as shown below:

In the Specification

At Column 5, Line 26, after "least" please delete "to"

At Column 6, Line 6, after "stop" please delete "to"

At Column 6, Line 53, after "carafe 2" please delete "to"

Signed and Sealed this
Twelfth Day of December, 2017

Joseph Matal
*Performing the Functions and Duties of the*
*Under Secretary of Commerce for Intellectual Property and*
*Director of the United States Patent and Trademark Office*